(12) United States Patent
Hidaka et al.

(10) Patent No.: US 11,951,829 B2
(45) Date of Patent: Apr. 9, 2024

(54) POWER TRANSMISSION DEVICE (71) Applicant: Mazda Motor Corporation, Hiroshima (JP)

(72) Inventors: Seiji Hidaka, Aki-gun (JP); Atsushi Nakano, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 696 days.

(21) Appl. No.: 17/185,512

(22) Filed: Feb. 25, 2021

(65) Prior Publication Data

US 2021/0309103 A1   Oct. 7, 2021

(30) Foreign Application Priority Data

Apr. 1, 2020   (JP) .................................. 2020-065596

(51) Int. Cl.
*B60K 17/346* (2006.01)
*F16D 3/06* (2006.01)

(52) U.S. Cl.
CPC .............. *B60K 17/346* (2013.01); *F16D 3/06* (2013.01); *F16D 2300/22* (2013.01)

(58) Field of Classification Search
CPC .... B60K 17/34; B60K 17/35; B60K 17/3467; B60K 5/04; B60K 2023/0833; B60K 23/0808; F16D 3/06; F16D 3/12; F16D 3/50; F16D 3/58; F16D 3/68; F16D 2300/22; B60Y 2400/4244
See application file for complete search history.

(56) References Cited

U.S. PATENT DOCUMENTS

| 2,848,884 | A | * | 8/1958 | Maude | ................... F16D 7/002 464/30 |
| 3,400,558 | A | * | 9/1968 | Haines | ..................... F16D 3/06 464/903 |
| 2009/0139811 | A1 | * | 6/2009 | Mochihara | .......... F16F 15/1435 188/268 |

(Continued)

FOREIGN PATENT DOCUMENTS

| JP | 2002337562 | A | * | 11/2002 |
| JP | 3682783 | B2 | * | 8/2005 |
| JP | 6237883 | B2 | | 11/2017 |

*Primary Examiner* — Lori Wu
(74) *Attorney, Agent, or Firm* — Alleman Hall & Tuttle LLP (57) ABSTRACT A power transmission device is provided, which includes a main-drive-wheel drive part, and an auxiliary-drive-wheel drive part having a power extraction part which has a transfer gear set comprised of a transfer drive gear connected to the main-drive-wheel drive part and a transfer driven gear meshing with the transfer drive gear and configured to transmit power to the auxiliary drive wheels. In a power transmission path from the main-drive-wheel drive part to the transfer drive gear, an input shaft connected to the main-drive-wheel drive part and a power transmission shaft connected to the transfer drive gear are coupled to each other in a radial direction through a first spline having a first backlash. A first shear damper without backlash and a second shear damper provided with a second spline having a second backlash smaller than the first backlash are provided between the input shaft and the power transmission shaft.

20 Claims, 6 Drawing Sheets

(56) References Cited

U.S. PATENT DOCUMENTS

| | | | |
|---|---|---|---|
| 2015/0045126 A1* | 2/2015 | Hansen | B62D 7/224 |
| | | | 29/434 |
| 2017/0008395 A1 | 1/2017 | Ohkawa et al. | |
| 2017/0028845 A1* | 2/2017 | Ohkawa | B60K 17/344 |
| 2017/0129332 A1* | 5/2017 | Nishimura | B60K 17/22 |
| 2018/0257487 A1* | 9/2018 | Ohkawa | B60K 17/3505 |

* cited by examiner

POWER TRANSMISSION DEVICE

TECHNICAL FIELD

The present disclosure relates to a power transmission device for a vehicle provided with main drive wheels and auxiliary drive wheels.

BACKGROUND OF THE DISCLOSURE

Generally, power transmission devices for a four-wheel drive vehicle which can be switched between a two-wheel drive (2WD) state and a four-wheel drive (4WD) state have a main drive wheel drive part which transmits an output torque from a drive source to main drive wheels, and an auxiliary drive wheel drive part provided with a power extraction part which extracts the torque to be transmitted to auxiliary drive wheels from the main drive wheel drive part.

For example, for a so-called "FF (front-engine, front-drive) based" 4WD vehicle in which an engine is mounted on a front part of a vehicle body as a drive source and the main drive wheels are front wheels, the output torque of the engine is transmitted to the front wheels through a transmission which constitutes a power transmission device, a differential gear for the front wheels which constitutes a front-wheel (main drive wheel) drive part, and a pair of left and right drive shafts. The torque inputted into the front-wheel drive part is extracted by the power extraction part through a differential case of the front-wheel differential gear, and the torque extracted by the power extraction part is transmitted to the rear wheels through a propeller shaft for the rear wheels, a differential gear for the rear wheels, and a pair of left and right drive shafts. Note that the power extraction part, the propeller shaft for the rear wheels, the rear-wheel differential gear, and the pair of left and right drive shafts constitute a rear-wheel (auxiliary drive wheel) drive part.

The power extraction part has a transfer gear set comprised of bevel gears which mesh with each other in order to transmit the torque to the propeller shaft for the rear wheels of which the axial center extends in the vehicle front-and-rear direction from the front-wheel differential gear of which the axial center extends in the vehicle width direction. The transfer gear set has a transfer drive gear disposed on the axial center of the front-wheel differential gear, and a transfer driven gear provided on the axial center of the propeller shaft.

Meanwhile, in the 4WD vehicle, since the 4WD state in which the front wheels and the rear wheels are driven increases the drive loss to lower the fuel efficiency according to the distributing ratio of the engine output torque to the rear wheels, as compared with the 2WD state in which only the front wheels are driven, the vehicle normally travels in the 2WD state, and changes the state into the 4WD state as needed.

However, an output torque variation of the engine is transmitted to the power extraction part through the transmission and the front-wheel differential gear, and in the 2WD state, the rear-wheel drive part, such as the propeller shaft and the rear-wheel differential gear, located from the transfer gear set in the power extraction part to the rear wheels, rotates in a no-power transmitting state in which the rear-wheel drive part does not transmit the torque.

Thus, depending on the frequency of the engine torque variation, the rear-wheel drive part having a given natural frequency to a torsional oscillation may resonate with the engine torque variation to increase vibration of the rear-wheel drive part. Noise may occur due to tooth hammering between the transfer drive gear and the transfer driven gear which originates in the vibration, and this causes noise inside the cabin.

Note that the no-power transmitting state includes a zero torque state in which the torque transmitted to the rear-wheel drive part is zero, a low-torque range in which the torque is comparatively low (e.g., in the 2WD state, and a state of the torque transmitted to the rear-wheel drive part in a state where the rear-wheel drive part resonates with the engine torque variation in a phase of transitioning from the 2WD state to the 4WD state).

Thus, for example, as disclosed in JP6237883B2, suppressing the tooth hammering sound in the 2WD state has been examined by providing a damper on a power transmitting path from the front-wheel drive part to the transfer drive gear (e.g., from an input shaft of the power extraction part connected to the differential case of the front-wheel differential gear to the transfer drive gear). In this case, since the torsional rigidity of the rear-wheel drive part is reduced, it is possible to shift the natural frequency of the rear-wheel drive part into an oscillating range in which the rear-wheel drive part does not resonate with the torque variation which may occur in a normal range of the engine speed.

That is, the characteristic of the damper for shifting the resonance point of the rear-wheel drive part to the lower frequency side of the normal range is desirable to have a low rigidity in which an amount of relative displacement becomes larger relative to the input torque in a low-torque range where the input torque from the engine is comparatively low (a range where the rear-wheel drive part becomes in the no-power transmitting state).

JP6237883B2 discloses a shear-type damper in FIG. 8($a$) and a compression-type damper in FIG. 8($b$), and these dampers are known to be provided on the power transmitting path.

The shear damper is provided with an inner cylinder part, an outer cylinder part, and a cylindrical elastic member made of rubber, etc. provided between these cylinder parts. Since a relative movement in the circumferential direction occurs between the inner cylinder part and the outer cylinder part due to the engine torque variation when a torque transmission occurs between the inner cylinder part and the outer cylinder part, the elastic member is shear-deformed so that it is twisted in the circumferential direction.

On the other hand, the compression-type damper includes an inner cylinder part having, on an outer circumferential surface, a plurality of first protrusions spaced therebetween in the circumferential direction, an outer cylinder part having, on the inner circumferential surface, a plurality of second protrusions spaced therebetween in the circumferential direction, and a plurality of elastic members made of rubber, etc. disposed between the inner cylinder part and the outer cylinder part so that the elastic members are sandwiched between the first protrusions and the second protrusions from both sides in the circumferential direction. When the inner cylinder part is relatively displaced in the circumferential direction with respect to the outer cylinder part, the plurality of elastic members between the first and second protrusions which approach each other are compression-deformed.

As described above, since the compression damper has a more complicated structure, a larger number of components, and a higher cost, as compared with the shear damper, the shear damper may be desirable to be used in terms of the cost.

Meanwhile, an angle of torsion of the shear damper (an amount of relative displacement between the inner cylinder part and the outer cylinder part) has a torsional limit which is determined by the characteristic of the elastic members. Therefore, a stopper mechanism which regulates the relative movement between the cylinder parts before reaching the torsional limit may be provided. When the stopper mechanism operates, a torque which is inputted to the input shaft and exceeds a given value is transmitted to the transfer gear, without passing through the damper.

In a case where the rigidity of the damper provided with the stopper mechanism is low (a transmission torque capacity of the damper is low), the rigidity of the rear-wheel drive part increases rapidly, when the stopper mechanism operates while the torque transmitted to the rear-wheel drive part is in the low-torque range. Thus, the natural frequency of the rear-wheel drive part cannot be shifted until the torque transmitted to the rear-wheel drive part reaches a high-torque range where the torque becomes larger than that in a non-drive state, and therefore, the tooth hammering sound may occur.

Note that the high-torque range includes, for example, a state where the torque is transmitted to the rear-wheel drive part to the extent so that the rear-wheel drive part does not resonate with the engine torque variation in the 4WD state and in a phase of transitioning from the 2WD state to the 4WD state.

Therefore, in order to suppress the tooth hammering sound, it is desirable to bring the torque transmitted to the rear-wheel drive part when the stopper mechanism is operated closer to the high-torque range (a torque-transmitting state where the rear-wheel drive part does not resonate with the torque variation in the normal range of the engine). That is, it is desirable to set the rigidity of the damper as a high rigidity near the high-torque range (reducing the amount of relative displacement with respect to the input torque). In other words, it is desirable to improve the transmission torque capacity of the damper near the high-torque range.

As described above, as the performance of the damper, it is desirable to use the elastic member with the low rigidity for lowering of the torsional rigidity of the rear-wheel drive part in the state where the torque inputted into the damper is in the low-torque range (the rear-wheel drive part is in the no-power transmitting state). On the other hand, in the low-torque range immediately before the torque inputted into the damper reaches the high-torque range (where the stopper mechanism operates), it is desirable to use the elastic member with high rigidity in which the amount of relative movement is small with respect to the input torque, in order to suppress the tooth hammering sound which is caused by forming the power transmitting path without the intervening damper while the transmission torque capacity of the damper stays low. For example, the characteristic curve is desirably an upwardly bending curve such as half of a parabola.

However, generally, since the characteristic curve of the angle of torsion with respect to the input torque of the shear damper is substantially linear, it is difficult to obtain the optimal characteristic over the entire range from the low-torque range to the high-torque range.

SUMMARY OF THE DISCLOSURE

Therefore, the present disclosure is made in view of addressing the above problems, and one purpose thereof is to provide a power transmission device for a vehicle with main drive wheels and auxiliary drive wheels, which can acquire an aimed damper characteristic while using a shear damper.

Note that the above problems may similarly occur in a so-called "FR (front-engine, rear-drive) based" four-wheel drive vehicle, a so-called "RR (rear-engine, rear-drive) based" four-wheel drive vehicle, and a so-called "RF (rear-engine, front-drive) based" four-wheel drive vehicle.

In order to solve the problem, a power transmission device according to one aspect of the present disclosure is configured as follows.

The power transmission device includes a main drive wheel drive part configured to transmit power from a drive source to main drive wheels, and an auxiliary drive wheel drive part having a power extraction part configured to extract from the main drive wheel drive part the power to be transmitted to auxiliary drive wheels. The power extraction part has a transfer gear set comprised of a transfer drive gear connected to the main drive wheel drive part, and a transfer driven gear meshing with the transfer drive gear and configured to transmit the power to the auxiliary drive wheels. In a power transmission path from the main drive wheel drive part to the transfer drive gear, an input shaft connected to the main drive wheel drive part, and a power transmission shaft connected to the transfer drive gear are coupled to each other in a radial direction through a first spline having a first backlash. A first shear damper without backlash and a second shear damper provided with a second spline having a second backlash smaller than the first backlash are provided between the input shaft and the power transmission shaft.

According to this configuration, the torque inputted into the input shaft is transmitted to the transfer drive gear through the first damper which does not have the backlash until the second backlash is eliminated (e.g., particularly in the low-torque range among the state where the torque inputted into the input shaft is low, the auxiliary drive wheel drive part is in a no-power transmitting state, or a torque-transmitting state where the auxiliary drive wheel drive part does not resonate with the torque variation in the normal range of an engine). The rigidity of the auxiliary drive wheel drive part can be reduced by the first damper.

Moreover, the torque inputted into the input shaft is transmitted to the transfer drive gear through the second damper, in addition to through the first damper, until the first backlash is eliminated after the torque inputted into the input shaft reaches a given input torque at which the second backlash is eliminated (e.g., until the torque inputted into the input shaft reaches a high-torque range, the auxiliary drive wheel drive part becomes in the power transmitting state, or the auxiliary drive wheel drive part becomes in the torque-transmitting state in the normal range of the engine where it does not resonate with the torque variation). Therefore, the first damper and the second damper can reduce the rigidity of the auxiliary drive wheel drive part, and the transmission torque capacity can be obtained by the first damper and the second damper, increased more than that only by the first damper.

Moreover, when the torque inputted into the input shaft reaches above a given input torque at which the first backlash is eliminated, the torque inputted into the input shaft is transmitted to the transfer drive gear bypassing the dampers, in addition to passing the first damper and the second damper.

Thus, according to the splines provided with the backlashes of different sizes which are formed in the power transmitting path from the main drive wheel drive part to the transfer drive gear, the power transmitting path is selected according to the magnitude of transmission torque of the power transmission device, and therefore, the rigidity of power transmitting path can be changed.

Therefore, in the power transmitting path through the first damper, by reducing torsional rigidity of the auxiliary drive wheel drive part, it becomes possible to shift the natural frequency to an oscillating range in which the auxiliary drive wheel drive part does not resonate with the torque variation which may be caused in the normal range of the engine speed, and tooth hammering sound between the transfer gear sets can be suppressed. In the power transmitting path through the first damper and the second damper, the torque which can be taken by the damper (transmission torque capacity) can be increased, while reducing the torsional rigidity of the auxiliary drive wheel drive part.

Therefore, in the state where the torque inputted into the input shaft is in a low-torque range (in the no-power transmitting state where the auxiliary drive wheel drive part does not transmit the torque), the power transmission device has the characteristic of low rigidity for lowering of the torsional rigidity of the auxiliary drive wheel drive part, and in the state where the torque inputted into the damper approaches the high-torque range (where a stopper mechanism operates), it has the characteristic of high rigidity for suppressing the rapid rigidity increase.

As described above, according to the power transmission device for the vehicle provided with the drive wheels and the auxiliary drive wheels, since the shear damper is used, the cost can be reduced, and the aimed characteristic of the rigidity between the input shaft and the transfer drive gear can be acquired.

The second shear damper may be higher in rigidity than the first shear damper.

According to this configuration, the rigidity of the second damper is set higher than the rigidity of the first damper. Thus, as compared with a case where the rigidity of the second damper is equal to the rigidity of the first damper, the transmission torque capacity (rigidity) which can be taken by the first damper and the second damper can be increased. Moreover, by increasing the rigidity of the second damper, the slope of the input torque to the angle of torsion of the second damper can be made steeper. Therefore, the characteristic curve, which is drawn as an upwardly bending curve, in which the low-torque range by the first damper can be expanded, and the input shaft and the power transmission shaft can easily and smoothly reach the direct coupling state, can be easily obtained.

The second shear damper and the first shear damper may be disposed in this order from the input shaft side.

According to this configuration, the first damper which transmits power in the state where the torque is lower compared to the second damper is disposed on the anti-input shaft side of the second damper. Since the first damper is responsible for the power transmission in the low-torque range, the spline-fitting area between the input shaft and the first damper can be shortened according to the torque transmitted to the extent so that the necessary surface pressure is secured. As a result, it becomes possible to shorten the input shaft, and the weight and the cost can be reduced. Moreover, since the first damper is fitted onto the input shaft by the spline without the backlash, the falling-off of the dampers from the input shaft can be suppressed.

The first spline, the second spline, and a third spline provided to the first shear damper may form a common spline in the input shaft.

According to this configuration, since the common spline to the power transmission shaft, the first damper, and the second damper is formed in the input shaft, the above-described effect can be achieved by the simple structure where the angles of the backlashes are adjusted using the power transmission shaft, the inner cylinder part side of the first damper, and the inner cylinder part side of the second damper. Moreover, since the spline of the input shaft can be formed by a single machining process, the number of processes can be reduced and the cost can be reduced.

The main drive wheels may be disposed on the power source side of a vehicle body, and the auxiliary drive wheels may be disposed on the opposite side of the vehicle body from the power source.

According to this configuration, in a FWD state of a so-called "FF (front-engine, front-drive) based 4WD vehicle," or in a RWD state of a so-called "RR (rear-engine, rear-drive) based 4WD vehicle," the natural frequency of the auxiliary drive wheel drive part can be shifted to the oscillating range where the auxiliary drive wheel drive part does not resonate with the torque variation which may be caused in the normal range of the engine speed. Therefore, the tooth hammering sound at each engagement part of the auxiliary drive wheel drive part can be suppressed effectively.

The first shear damper may overlap with the transfer gear set in the axial direction of the input shaft.

According to this configuration, since the first damper is disposed so as to overlap with the transfer gear set in the axial direction of the input shaft, the axial dimension of the power extraction part can be reduced.

DETAILED DESCRIPTION OF THE DISCLOSURE

Hereinafter, a concrete configuration of a vehicle provided with a power transmission device according to the present disclosure is described with reference to the accompanying drawings.

Figure 1:
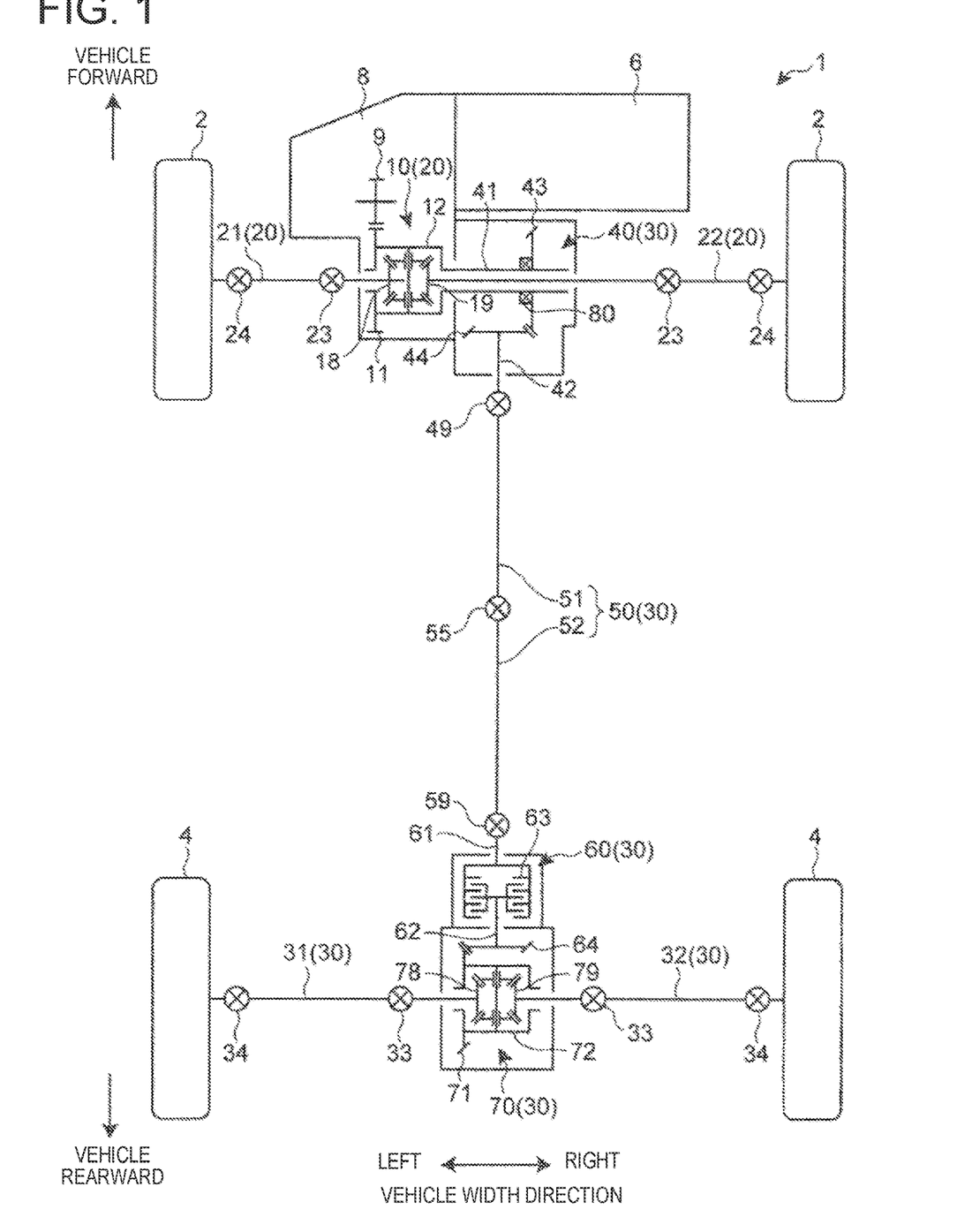
FIG. 1 is a view schematically illustrating a vehicle provided with a power transmission device according to one embodiment of the present disclosure.

As illustrated in FIG. 1, a vehicle 1 provided with a power transmission device according to this embodiment is a so-called "FF (front-engine, front-drive) based four-wheel drive (4WD) vehicle" which includes left and right front wheels 2 as main drive wheels and left and right rear wheels 4 as auxiliary drive wheels, and can switch between a front-wheel drive (FWD) state and a 4WD state.

The vehicle 1 is provided with an engine 6 as a drive source. The engine 6 is a transverse type and is disposed in an engine bay in a front part of the vehicle 1. A transaxle 8 which constitutes part of the power transmission device is provided on one side of the engine 6 in the vehicle width direction (e.g., left side). For example, the transaxle 8 includes a transmission (not illustrated) coupled to an output shaft of the engine 6 through a torque converter (not illustrated), and a differential gear 10 for the front wheels coupled to an output gear 9 as an outputting part of the transmission.

The power transmission device is comprised of a front-wheel (main drive wheel) drive part 20 which transmits output torque from the engine 6 to the front wheels 2, and a rear-wheel (auxiliary drive wheel) drive part 30 provided with a transfer apparatus 40 as a power extraction part which extracts the torque to be transmitted to the rear wheels 4 from the front-wheel (main drive wheel) drive part 20.

The front wheels 2 are coupled to the engine 6 through drive shafts 21 and 22 for the front wheels, the front-wheel differential gear 10, and the transmission. The front-wheel (main drive wheel) drive part 20 includes the front-wheel differential gear 10, and the front-wheel drive shafts 21 and 22. The front wheels 2 are coupled to the engine 6 not through a coupling 60 (described later) so that power is transmitted to the front wheels 2 from the engine 6 both in an engaged state and a disengaged state of the coupling 60.

The front-wheel drive shafts 21 and 22 are disposed so as to extend in the vehicle width direction. Each of the front-wheel drive shafts 21 and 22 is comprised of a plurality of shaft members coupled, for example, through a pair of universal joints 23 and 24.

The front-wheel differential gear 10 includes a differential ring gear 11 which meshes with the output gear 9 of the transmission, a differential case 12 to which the differential ring gear 11 is fixed or which is provided integrally with the differential ring gear 11, and left and right side gears 18 and 19 accommodated in the differential case 12.

One end parts of the front-wheel drive shafts 21 and 22 are coupled to the side gears 18 and 19 of the front-wheel differential gear 10, for example, by spline fitting so that the drive shafts 21 and 22 rotate with the side gears 18 and 19, respectively. The power transmitted to the differential case 12 of the front-wheel differential gear 10 through the differential ring gear 11 from the output gear 9 of the transmission is transmitted to the left and right front-wheel drive shafts 21 and 22 so that a rotational difference becomes a value according to the traveling condition.

On the other hand, the rear wheels 4 are coupled to the engine 6 through drive shafts 31 and 32 for the rear wheels, a differential gear 70 for the rear wheels, the coupling 60, a propeller shaft 50, the transfer apparatus 40, the differential case 12 of the front-wheel differential gear 10, and the transmission. The rear-wheel drive part 30 includes the transfer apparatus 40, the propeller shaft 50, the coupling 60, the rear-wheel differential gear 70, and the rear-wheel drive shafts 31 and 32.

The rear-wheel drive shafts 31 and 32 are disposed so as to extend in the vehicle width direction. Each of the rear-wheel drive shafts 31 and 32 is comprised of, for example, a plurality of shaft members coupled through a pair of universal joints 33 and 34.

The rear-wheel differential gear 70 includes, similar to the front-wheel differential gear 10, a differential ring gear 71, a differential case 72, and left and right side gears 78 and 79. One end parts of the rear-wheel drive shafts 31 and 32 are coupled to the side gears 78 and 79, for example, by spline fitting so that they rotate with the side gears 78 and 79, respectively.

The coupling 60 includes an input shaft 61, an output shaft 62, and a plurality of friction plates 63 which couple the input shaft 61 to the output shaft 62 so as to be connectable and disconnectable. The coupling 60 is, for example, an electronically controlled coupling, and torque is distributed to the front and rear wheels by an engaging force between the friction plates 63 being controlled. The torque distribution (front wheels:rear wheels) is controllable, for example, within a range of 50:50 to 100:0.

The input shaft 61 of the coupling 60 is disposed on an axis extending in the vehicle front-and-rear direction. The input shaft 61 is coupled to a rear end part of the propeller shaft 50 which is a rotating member on the engine 6 side of the coupling 60.

The plurality of friction plates 63 is comprised of, for example, a multiplate wet clutch. An engaging force is applied to the plurality of friction plates 63 by being pressed by a piston (not illustrated). The piston is operated, for example, through an electromagnetic clutch and a cam mechanism.

The output shaft 62 of the coupling 60 is disposed coaxially with the input shaft 61, rearward of the input shaft 61. A pinion gear 64 is provided to a rear end part of the output shaft 62. The pinion gear 64 meshes with the differential ring gear 71 of the rear-wheel differential gear 70. Thus, the output shaft 62 is coupled to the differential case 72 which is the rotating member on the rear wheels 4 side of the coupling 60, through an engage part between the pinion gear 64 and the differential ring gear 71.

The pinion gear 64 and the differential ring gear 71 are comprised of, for example, bevel gears, such as hypoid gears. The axial center of the pinion gear 64 is offset below the axial center of the differential ring gear 71 in the vehicle up-and-down direction. The differential ring gear 71 has a larger diameter than the pinion gear 64. Thus, rotation of the output shaft 62 of the coupling 60 is slowed down and is transmitted to the differential case 72 of the rear-wheel differential gear 70.

The propeller shaft 50 transmits the power extracted by the transfer apparatus 40 to the rear wheels 4 side. The propeller shaft 50 extends in the vehicle front-and-rear direction. The propeller shaft 50 is comprised of, for example, two shaft members 51 and 52 coupled to each other in the vehicle front-and-rear direction through a universal joint 55. A rear end part of the propeller shaft 50 is coupled to a front end part of the input shaft 61 of the coupling 60 through a universal joint 59.

The transfer apparatus 40 is disposed on one of the front-wheel drive shafts 21 and 22 (e.g., right). The transfer apparatus 40 is coupled to the differential case 12 of the front-wheel differential gear 10 at its input side, and is coupled to a front end part of the propeller shaft 50 through a universal joint 49 at its output side.

Thus, in a state where the coupling 60 is coupled, a part of the power of the engine 6 transmitted to the differential case 12 of the front-wheel differential gear 10 through the transmission is extracted by the transfer apparatus 40 to the rear wheels 4 side. The configuration of the transfer apparatus 40 will be described later.

In the state where the coupling 60 is coupled, the power of the engine 6 extracted by the transfer apparatus 40 is transmitted to the rear wheels 4 from the transfer apparatus 40 through the propeller shaft 50, the coupling 60, the rear-wheel differential gear 70, and the rear-wheel drive shafts 31 and 32. The power inputted into the differential case 72 of the rear-wheel differential gear 70 is transmitted to the left and right rear wheels 4 through the left and right rear-wheel drive shafts 31 and 32 so that the rotational difference becomes a value according to the traveling condition.

The configuration of the transfer apparatus 40 is described with reference to a cross-sectional view of FIG. 2.

The transfer apparatus 40 includes an input shaft 41 which extends in the vehicle width direction, an output shaft 42 which extends in the vehicle front-and-rear direction, a transfer drive gear (hereinafter, referred to as the "drive gear") 43 which is provided on the input shaft 41, a transfer driven gear (hereinafter, referred to as the "driven gear") 44 which is provided on the output shaft 42 and meshes with the drive gear 43, and a transfer case 48 which accommodates a part of the input shaft 41, a part of the output shaft 42, the drive gear 43, and the driven gear 44.

The input shaft 41 and the drive gear 43 are connected with each other through a power transmission shaft 46. The input shaft 41 and the power transmission shaft 46 are cylindrical members disposed on the axial center of the front-wheel drive shaft 22.

The input shaft 41 is fitted onto one of the front-wheel drive shafts 22 with a gap. One (left side in FIG. 2) of end parts (not illustrated) of the input shaft 41 is coupled to the differential case 12 (see FIG. 1) of the front-wheel differential gear 10, for example, by spline fitting, and therefore, the input shaft 41 rotates with the differential case 12.

Figure 2:
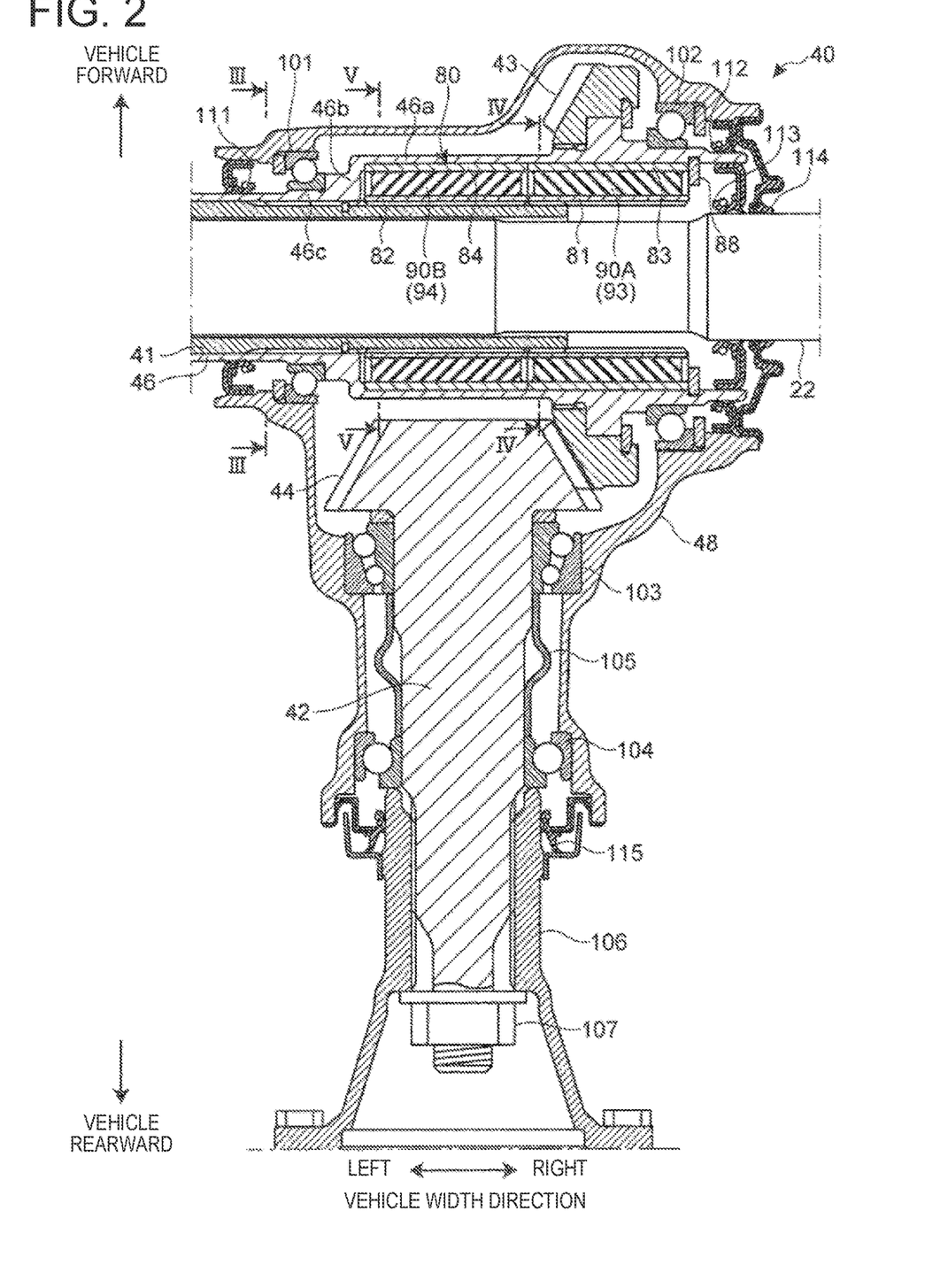
FIG. 2 is a cross-sectional view illustrating a damper and its periphery in a power extraction part of the power transmission device.

The power transmission shaft 46 extends so as to project to the opposite side of the differential case 12 more than the input shaft 41 (to the right side in FIG. 2: "anti-differential case 12 side"). The power transmission shaft 46 has a large-diameter part 46a which is formed larger in the diameter than outer cylinder parts 83 and 84 of at least one damper 80 (described later) and is disposed outside the outer cylinder parts 83 and 84. The power transmission shaft 46 is provided with an annular vertical wall part 46b which protrudes radially inward from an end part of the large-diameter part 46a on the differential case 12 side (left side in FIG. 2), and a cylindrical small-diameter part 46c which is formed smaller in the diameter than the large-diameter part 46a and extends to the differential case 12 side in the axial direction along an outer circumferential part of the input shaft 41 from the vertical wall part 46b.

The power transmission shaft 46 is spline-fitted onto the input shaft 41 at the small-diameter part 46c. The power transmission shaft 46 is rotatably supported by the transfer case 48 through a pair of bearings 101 and 102 disposed with a spacing therebetween in the vehicle width direction. The spline-fitting part between the input shaft 41 and the power transmission shaft 46 overlaps with the bearing 101 in the axial direction.

The drive gear 43 is provided to an outer circumference of the power transmission shaft 46. The drive gear 43 is spline-fitted onto the power transmission shaft 46, and therefore, it rotates with the input shaft 41.

The input shaft 41 is provided with the at least one so-called "shear" damper 80 which attenuates a torsional oscillation by an elastic member being shear-deformed in the circumferential direction. By providing the at least one damper 80 on a power transmitting path from the input shaft 41 of the transfer apparatus 40, which is connected to the differential case 12 of the front-wheel drive part 20, to the drive gear 43, the torsional rigidity of the rear-wheel drive part 30 is reduced. Therefore, the natural frequency related to the torsional vibration of the rear-wheel drive part 30 is shifted to a frequency zone where the rear-wheel drive part 30 does not resonate with the torque variation which may be caused in the normal range of the engine speed. The concrete configuration of the at least one damper 80 will be described later.

The output shaft 42 is a solid shaft member disposed so as to extend in the vehicle front-and-rear direction. The axial center of the output shaft 42 is disposed on the differential case 12 side of the drive gear 43 in the vehicle width direction. Moreover, the axial center of the output shaft 42 is offset below the axial center of the front-wheel drive shaft 22 in the vehicle up-and-down direction.

The output shaft 42 is rotatably supported by the transfer case 48 through a pair of front and rear bearings 103 and 104 which are disposed with a spacing therebetween in the vehicle front-and-rear direction. Between inner rings of the pair of bearings 103 and 104, a cylindrical distance piece 105 fitted onto the output shaft 42 is provided.

A connecting member 106 is fitted onto a part of the output shaft 42 which is rearward of the rearward bearing 104. The universal joint 49 (see FIG. 1) is fixed to a rear end part of the connecting member 106. Thus, the output shaft 42 is coupled to a front end part of the propeller shaft 50 (see FIG. 1) through the connecting member 106 and the universal joint 49.

A nut 107 is threadedly engaged with a rear end part of the output shaft 42. By tightening the nut 107, the inner rings of the pair of bearings 103 and 104, the distance piece 105, and the connecting member 106 which are sandwiched between the driven gear 44 and the nut 107 on the output shaft 42 are positioned in the axial direction and are fixed to the output shaft 42.

When tightening the nut 107 during assembly, the distance piece 105 is plastically deformed through an elastically deformed state, and in the plastically deformed state of the distance piece 105, and the preload of the bearings 103 and 104 is adjusted.

The driven gear 44 is provided, for example, integrally with the front end part of the output shaft 42. Although the driven gear 44 is cantilever-supported from the rear through the pair of bearings 103 and 104, the support rigidity of the driven gear 44 is increased by precisely managing the preload of bearings 103 and 104 as described above.

The drive gear 43 and the driven gear 44 are bevel gears, such as hypoid gears, for example. The teeth of the drive gear 43 are oriented toward the differential case 12 in the vehicle width direction, and the teeth of the driven gear 44 are oriented forward. The driven gear 44 has a smaller diameter than the drive gear 43. Therefore, rotation of the input shaft 41 of the transfer apparatus 40 is accelerated and transmitted to the output shaft 42 and the propeller shaft 50 (see FIG. 1).

The lubricating oil is filled inside the transfer case 48. The lubricating oil contains a component which is capable of securely preventing the seizure at the engage part between the drive gear 43 and the driven gear 44.

Between an outer circumferential surface of the power transmission shaft 46 of the input shaft 41 and an inner circumferential surface of the transfer case 48, between an inner circumferential surface of the power transmission shaft 46 and an outer circumferential surfaces of the front-wheel drive shaft 22, between an outer circumferential surface of the front-wheel drive shaft 22 and an inner circumferential surface of the transfer case 48, and between an outer circumferential surface of the connecting member 106 and an inner circumferential surface of the transfer case 48, sealing members 111 and 112, 113, 114, and 115 are provided, respectively, to secure oiltightness or airtightness between both the members while permitting a relative rotation of the members.

The at least one damper 80 is comprised of a first damper 80A having a first rigidity, and a second damper 80B having a second rigidity higher than the first rigidity. The first damper 80A and the second damper 80B are disposed in this order from the anti-differential case 12 side in the axial direction (from the right side in FIG. 2). Characteristics of the dampers will be described later.

The first damper 80A has a double-pipe structure comprised of an inner cylinder part 81 and the outer cylinder part 83. The inner cylinder part 81 and the outer cylinder part 83 are comprised of, for example, metal cylindrical members, and are disposed on the axial center of the front-wheel drive shaft 22 and the input shaft 41. The inner cylinder part 81 is fitted onto the front-wheel drive shaft 22 with a gap therebetween. The inner cylinder part 81 is disposed so that an end part of the inner cylinder part 81 on the differential case 12 side overlaps with a tip-end part of the input shaft 41 on the anti-differential case 12 side (right side in FIG. 2) in the axial direction. The outer cylinder part 83 has a larger diameter than the inner cylinder part 81, and is disposed radially outward of the inner cylinder part 81 and inward of the power transmission shaft 46.

The inner cylinder part 81 is disposed on the axial center of the input shaft 41. The inner cylinder part 81 is spline-fitted onto the input shaft 41. The outer cylinder part 83 is press-fitted into (the large-diameter part 46a of) the power transmission shaft 46.

The second damper 80B is disposed in an end part of the first damper 80A on the differential case 12 side in the axial direction (left side in FIG. 2), and a snap ring 88 attached to the inner circumferential surface of the power transmission shaft 46, on the anti-differential case 12 side of the outer cylinder part 83 in the axial direction, is disposed in an end part of the first damper 80A on the anti-differential case 12 side in the axial direction (right side in FIG. 2). The first damper 80A is positioned in the axial direction by using the second damper 80B and the snap ring 88.

The first damper 80A is further provided with a first elastic body layer 90A disposed between the inner cylinder part 81 and the outer cylinder part 83. The first elastic body layer 90A is comprised of, for example, a plurality of elastic members 93 made of rubber (see FIG. 4). The more concrete configuration of the first elastic body layer 90A will be described later.

Similarly to the first damper 80A, the second damper 80B has a double-pipe structure comprised of an inner cylinder part 82 and the outer cylinder part 84. The inner cylinder part 82 and the outer cylinder part 84 are comprised of, for example, metal cylindrical members, and are disposed on the axial center of the front-wheel drive shaft 22 and the input shaft 41. The inner cylinder part 82 is disposed adjacent on the anti-differential case 12 side (right side in FIG. 2) to the radially extending vertical wall part 46b of the power transmission shaft 46 in the axial direction. The outer cylinder part 84 has a larger diameter than the inner cylinder part 82, and is disposed radially outward of the inner cylinder part 82 and inward of the power transmission shaft 46.

The inner cylinder part 82 is disposed on the axial center of the input shaft 41. The inner cylinder part 82 is spline-fitted onto the input shaft 41. The outer cylinder part 84 is press-fitted into (the large-diameter part 46a of) the power transmission shaft 46.

The first damper 80A is disposed at an end part of the second damper 80B on the anti-differential case 12 side in the axial direction (right side in FIG. 2). The second damper 80B is positioned in the axial direction by using the snap ring 88 through the first damper 80A.

The second damper 80B is further provided with a second elastic body layer 90B disposed between the inner cylinder part 82 and the outer cylinder part 84. The second elastic body layer 90B is comprised of, for example, a plurality of elastic members 94 made of rubber (see FIG. 5). The more concrete configuration of the second elastic body layer 90B will be described later.

The spline-fitting part between the input shaft 41 and the power transmission shaft 46, the spline-fitting part between the input shaft 41 and the inner cylinder part 81 of the second damper 80B, and the spline-fitting part between the input shaft 41 and the inner cylinder part 82 of the first damper 80A are lined up in the axial direction in this order from the differential case 12 side (left side in FIG. 2). Common external teeth 41a (see FIGS. 3 to 5) formed on the outer circumferential surface of the input shaft 41 are used for these spline-fitting parts.

Figure 3:
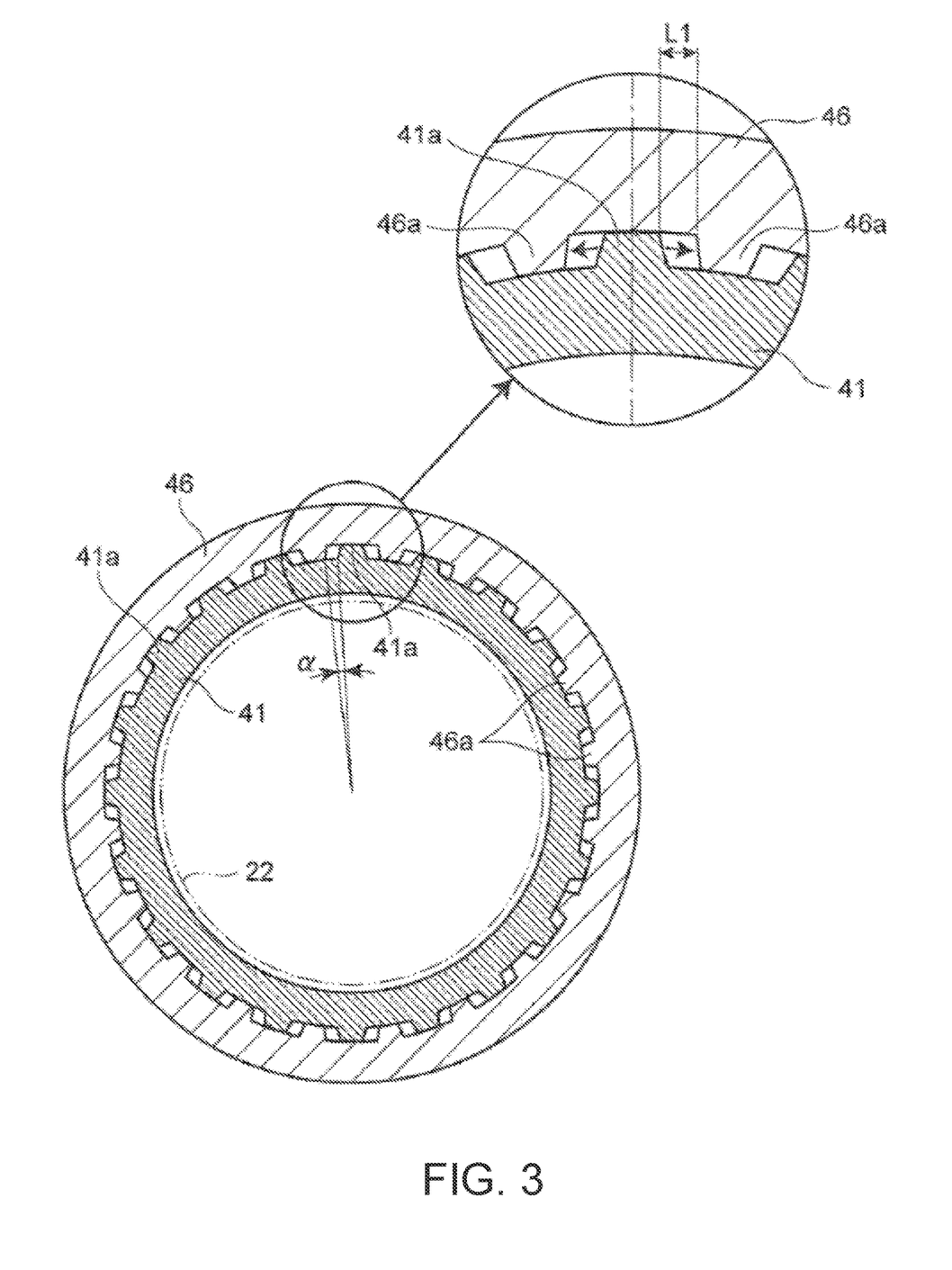
FIG. 3 is a cross-sectional view taken along a line in FIG. 2, illustrating a part of the power extraction part of the power transmission device, seen in the axial direction.
Figure 4:
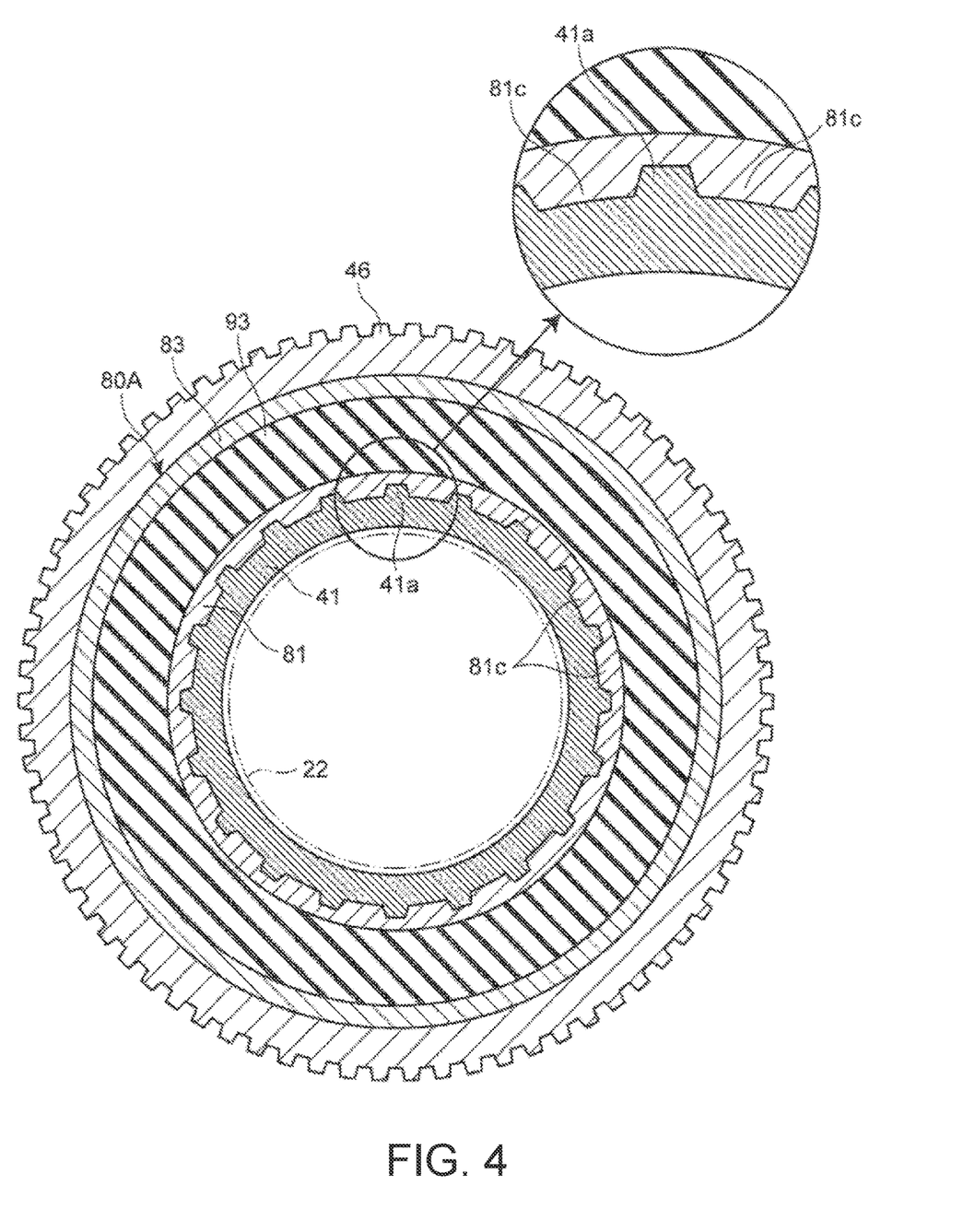
FIG. 4 is a cross-sectional view taken along a line IV-IV in FIG. 2, illustrating a part of the power extraction part of the power transmission device, seen in the axial direction.
Figure 5:
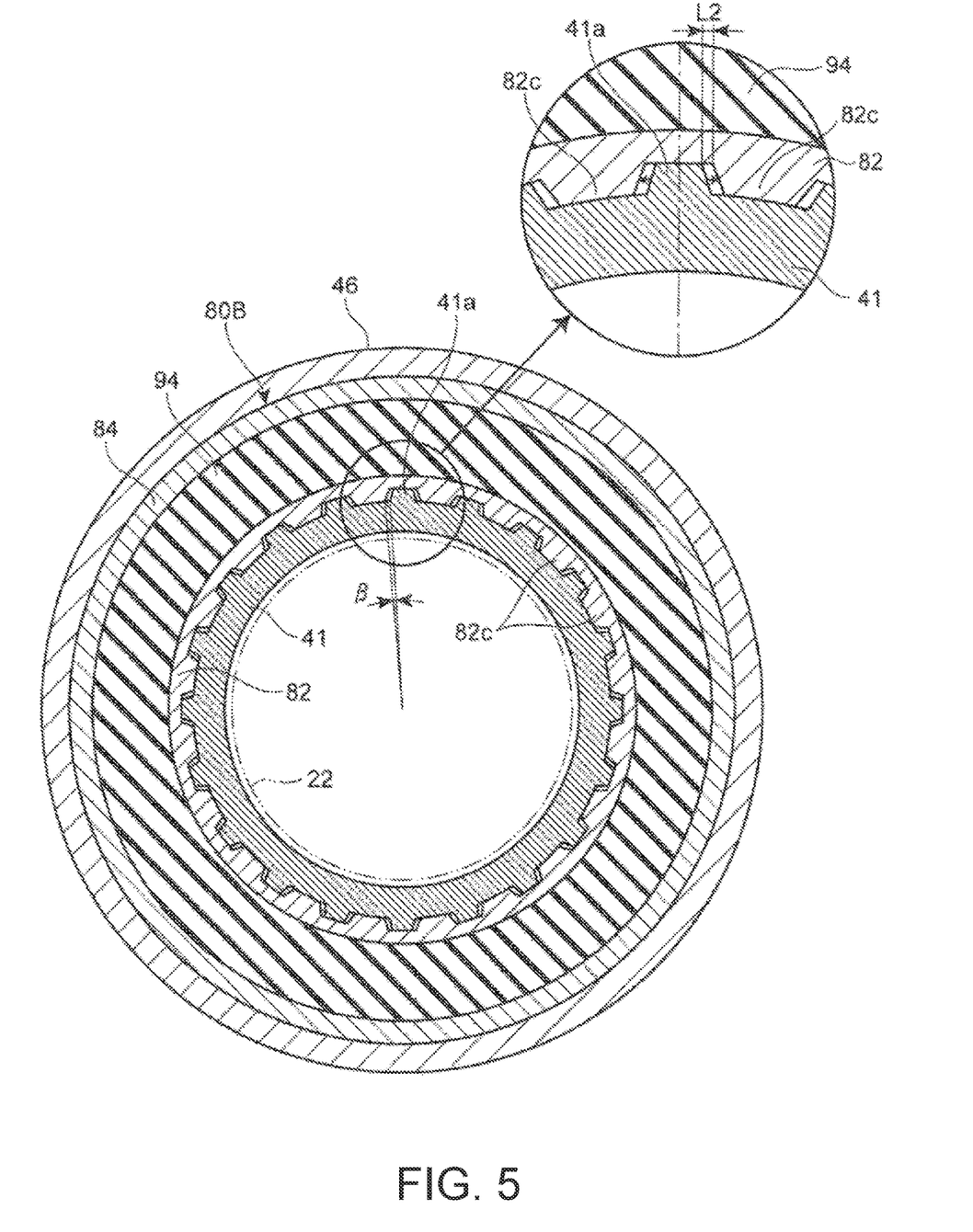
FIG. 5 is a cross-sectional view taken along a line V-V in FIG. 2, illustrating a part of the power extraction part of the power transmission device, seen in the axial direction.

FIG. 3 is a cross-sectional view illustrating the spline-fitting part between the input shaft 41 and the power transmission shaft 46 seen in the axial direction, and taken along a line III-III in FIG. 2. FIG. 4 is a cross-sectional view illustrating the spline-fitting part between the input shaft 41 and the inner cylinder part 82 of the first damper 80A seen in the axial direction, and taken along a line IV-IV in FIG. 2. FIG. 5 is a cross-sectional view illustrating the spline-fitting part between the input shaft 41 and the inner cylinder part 81 of the second damper 80B seen in the axial direction, and taken along a line V-V in FIG. 2. Moreover, in FIGS. 3 to 5, the front-wheel drive shaft 22 is illustrated by a two-dot chain line.

As illustrated in FIG. 3, in the spline-fitting part between the input shaft 41 and the power transmission shaft 46, each external tooth 41a of the input shaft 41 is disposed at a center part in the circumferential direction between a pair of adjacent internal teeth 46a of the power transmission shaft 46 so as to be relatively movable within a given range L1 in the circumferential direction. Thus, the input shaft 41 and the power transmission shaft 46 are permitted in the relative rotation within a given angle range $\alpha$.

On the other hand, in the spline-fitting part between the input shaft 41 and the inner cylinder part 81 of the first damper 80A illustrated in FIG. 4, each external tooth 41a of the input shaft 41 is disposed between a pair of adjacent internal teeth 81c of the inner cylinder part 81 so that there is substantially no gap. Thus, in the spline-fitting part between the input shaft 41 and the inner cylinder part 81, the relative movement between the external tooth 41a and the internal tooth 81c in the circumferential direction, as a result, the relative rotation between the input shaft 41 and the inner cylinder part 81 are severely restricted, compared with the spline-fitting part between the input shaft 41 and the power transmission shaft 46.

Moreover, in this embodiment, the outer cylinder part 83 of the first damper 80A and the power transmission shaft 46 are coupled by press-fit, and the outer cylinder part 83 and the power transmission shaft 46 rotate integrally. Note that the outer cylinder part 83 of the first damper 80A and the power transmission shaft 46 may be spline-fitted. In such a case, also in the spline-fitting part (see FIG. 2), each external tooth of the outer cylinder part 83 is disposed between the pair of adjacent internal teeth of the power transmission shaft 46 so that there is substantially no gap, similarly to the spline-fitting part between the input shaft 41 and the inner cylinder part 81 which is illustrated in FIG. 4. Therefore, the relative rotation between the outer cylinder part 83 and the power transmission shaft 46 is severely restricted, similarly to the relative rotation between the input shaft 41 and the inner cylinder part 81.

In the spline-fitting part between the input shaft 41 and the inner cylinder part 82 of the second damper 80B illustrated in FIG. 5, each external tooth 41a of the input shaft 41 is disposed at a center part in the circumferential direction between a pair of adjacent internal teeth 82c of the inner cylinder part 82 so that the relative movement is possible within a given range L2 in the circumferential direction. Thus, the input shaft 41 and the second damper 80B is permitted in the relative rotation within a given angle range (3.

Moreover, in this embodiment, the outer cylinder part 84 of the second damper 80B and the power transmission shaft 46 are coupled by press-fit, and the outer cylinder part 84 and the power transmission shaft 46 rotate integrally. Note that the outer cylinder part 84 and the power transmission shaft 46 may be spline-fitted. In such a case, also in the spline-fitting part (see FIG. 2), similarly to the spline-fitting part between the input shaft 41 and the inner cylinder part 81 of the first damper 80A illustrated in FIG. 4, each external tooth of the outer cylinder part 84 is disposed between the pair of adjacent internal teeth of the power transmission shaft 46 so that there is substantially no gap. Therefore, the relative rotation between the outer cylinder part 84 and the power transmission shaft 46 is severely restricted.

The given angle range β which permits the relative rotation of the input shaft 41 and the second damper 80B is set smaller than the given angle range α which permits the relative rotation of the input shaft 41 and the power transmission shaft 46 (α>β).

As described above, a first backlash (a play in the circumferential direction) L1 caused between the external tooth 41a and the internal tooth 46a in the spline-fitting part (see FIG. 3) between the input shaft 41 and the power transmission shaft 46 is larger than a second backlash (a play in the circumferential direction) L2 (see FIG. 5) caused between the external tooth 41a and the internal tooth 82c in the spline-fitting part between the input shaft 41 and the inner cylinder part 82 of the second damper 80B.

Moreover, the backlash (see FIG. 5) caused between the external tooth 41a and the internal tooth 82c in the spline-fitting part between the input shaft 41 and the inner cylinder part 82 of the second damper 80B is larger than the backlash (see FIG. 4) caused between the external tooth 41a and the internal tooth 81c in the spline-fitting part between the input shaft 41 and the inner cylinder part 81 of the first damper 80A.

Moreover, the first backlash L1 in the spline-fitting part (see FIG. 3) between the input shaft 41 and the power transmission shaft 46 is larger than the second backlash L2 in the spline-fitting part (see FIG. 5) between the input shaft 41 and the inner cylinder part 82 of the second damper 80B. On the other hand, the second backlash L2 in the spline-fitting part (see FIG. 5) between the input shaft 41 and the inner cylinder part 82 of the second damper 80B is larger than the sum of the backlash in the spline-fitting part (see FIG. 4) between the input shaft 41 and the inner cylinder part 81 of the first damper 80A.

When torque below a given first value T1 (see FIG. 6) is transmitted between the input shaft 41 and the power transmission shaft 46, the input shaft 41 and the power transmission shaft 46 are relatively displaced in the circumferential direction, according to the inputted torque. At this time, the engagement of the external tooth and the internal tooth in each spline-fitting part of the input shaft 41 is made in the spline-fitting part between the input shaft 41 and the inner cylinder part 81 of the first damper 80A (see FIG. 4), prior to the spline-fitting part between the input shaft 41 and the power transmission shaft 46 (see FIG. 3) and the spline-fitting part between the input shaft 41 and the inner cylinder part 82 of the second damper 80B (see FIG. 5).

Therefore, when the torque transmitted between the input shaft 41 and the power transmission shaft 46 is below the given first value T1, the transmitting path of this torque passes through the spline-fitting part between the input shaft 41 and the inner cylinder part 82 of the second damper 80B, the first damper 80A, and the press-fitting part between the outer cylinder part 83 of the first damper 80A and the power transmission shaft 46 (see FIG. 2), while bypassing the spline-fitting part between the input shaft 41 and the power transmission shaft 46 (see FIG. 3) and the spline-fitting part between the input shaft 41 and the inner cylinder part 82 (see FIG. 5). Note that the given first value T1 is set based on the second backlash L2 (the given angle range of the relative rotation permitted between the input shaft 41 and the second damper 80B), and the rigidity of the first damper 80A.

That is, for example, when the torque inputted into the transfer apparatus 40 from the engine 6 side is below the given first value T1 (e.g., in the FWD state, or in the 4WD state where the torque distributed to the rear wheels 4 is comparatively low), the torque is transmitted through the first damper 80A in the transfer apparatus 40.

When torque above the given first value T1 and below a given second value T2 is transmitted between the input shaft 41 and the power transmission shaft 46, the input shaft 41 and the power transmission shaft 46 are relatively displaced in the circumferential direction, according to the inputted torque. Here, the engagement of the external teeth and the internal teeth in each spline-fitting part of the input shaft 41 takes place at the spline-fitting part between the input shaft 41 and the inner cylinder part 82 of the second damper 80B (see FIG. 5), in addition to the spline-fitting part between the input shaft 41 and the inner cylinder part 81 of the first damper 80A (see FIG. 4). Note that since the inputted torque is below the given second value, the spline-fitting part between the input shaft 41 and the power transmission shaft 46 (see FIG. 3) is not engaged. Note that the torque of the given second value T2 is set based on the first backlash L1 (the given angle range α of the relative rotation permitted between the input shaft 41 and the power transmission shaft 46), and the rigidity characteristics of the first damper 80A and the second damper 80B.

Therefore, when the torque transmitted between the input shaft 41 and the power transmission shaft 46 is above the given first value T1 and below the given second value T2, the transmitting path of this torque passes through the spline-fitting part between the input shaft 41 and the inner cylinder part 82 of the second damper 80B (see FIG. 5) and the press-fitting part between the outer cylinder part 84 of the second damper 80B and the power transmission shaft 46 (see FIG. 2), in addition to passing through the spline-fitting part between the input shaft 41 and the inner cylinder part 82, the first damper 80A, and the press-fitting part between the outer cylinder part 83 of the first damper 80A and the power transmission shaft 46 (see FIG. 2), while bypassing the spline-fitting part between the input shaft 41 and the power transmission shaft 46 (see FIG. 3).

That is, for example, when the torque inputted into the transfer apparatus 40 from the engine 6 side is between a value below the given first value and a value equal to the given second value (e.g., in the FWD state, or in the 4WD state where the torque distributed to the rear wheels 4 is comparatively low), the torque is transmitted in the path passing through the first damper 80A and the second damper 80B in the transfer apparatus 40.

On the other hand, when the torque transmitted between the input shaft 41 and the power transmission shaft 46 is above the given second value T2, the torque is transmitted through the spline-fitting part between the input shaft 41 and the power transmission shaft 46 (see FIG. 3).

That is, for example, when the torque inputted into the transfer apparatus 40 from the engine 6 side is above the given second value T2 (e.g., in the 4WD state where the engaging force is comparatively strong), the torque is transmitted in the transfer apparatus 40 through a path bypassing both the dampers 80 (80A, 80B), in addition to a path passing through the spline-fitting part between the input shaft 41 and the inner cylinder part 82, the first damper 80A, and the press-fitting part between the outer cylinder part 83 of the first damper 80A and the power transmission shaft 46 (see FIG. 2), and a path passing through the spline-fitting part between the input shaft 41 and the inner cylinder part 82 of the second damper 80B (see FIG. 5), and the press-fitting part between the outer cylinder part 84 of the second damper 80B and the power transmission shaft 46 (see FIG. 2).

When the torque is transmitted between the input shaft 41 and the power transmission shaft 46, the amount of relative movement between both the shaft members 41 and 46 in the circumferential direction is regulated below a given amount by interference of the external tooth 41a and the internal tooth 46a in the spline-fitting part between both the shaft members 41 and 46 (see FIG. 3). Thus, the amount of relative movement in the circumferential direction is regulated below the given amount also between the inner cylinder parts 81 and 82 of the dampers 80A and 80B spline-fitted to the input shaft 41 and the outer cylinder parts 83 and 84 spline-fitted to the power transmission shaft 46.

Thus, the spline-fitting part between the input shaft 41 and the power transmission shaft 46 (see FIG. 3) functions as a stopper mechanism which regulates the amount of relative displacement in the circumferential direction between the inner cylinder part 82 and the outer cylinder part 84 of the damper 80, and can suppress an excessive load from being applied to the elastic body layer 90 of the damper 80.

Meanwhile, in terms of the performance of the damper 80, it is desirable to use the elastic member with low rigidity for lowering of the torsional rigidity of the rear-wheel drive part 30 in a state where the torque inputted into the at least one damper 80 is in the low-torque range (the rear-wheel drive part is in the no-power transmitting state). On the other hand, in the low-torque range immediately before the torque inputted into the at least one damper 80 reaches the high-torque range (where the stopper mechanism operates), it is desirable to use the elastic member with high rigidity with the small amount of relative movement to the input torque, in order to suppress the tooth hammering sound caused by forming the power transmitting path bypassing the at least one damper 80 while the transmission torque capacity of the at least one damper 80 is low.

The damper 80 provided to the transfer apparatus 40 in this embodiment has the configuration for obtaining the characteristics described above. Here, the concrete characteristics of the at least one damper 80 is described with reference to FIG. 6.

Figure 6:
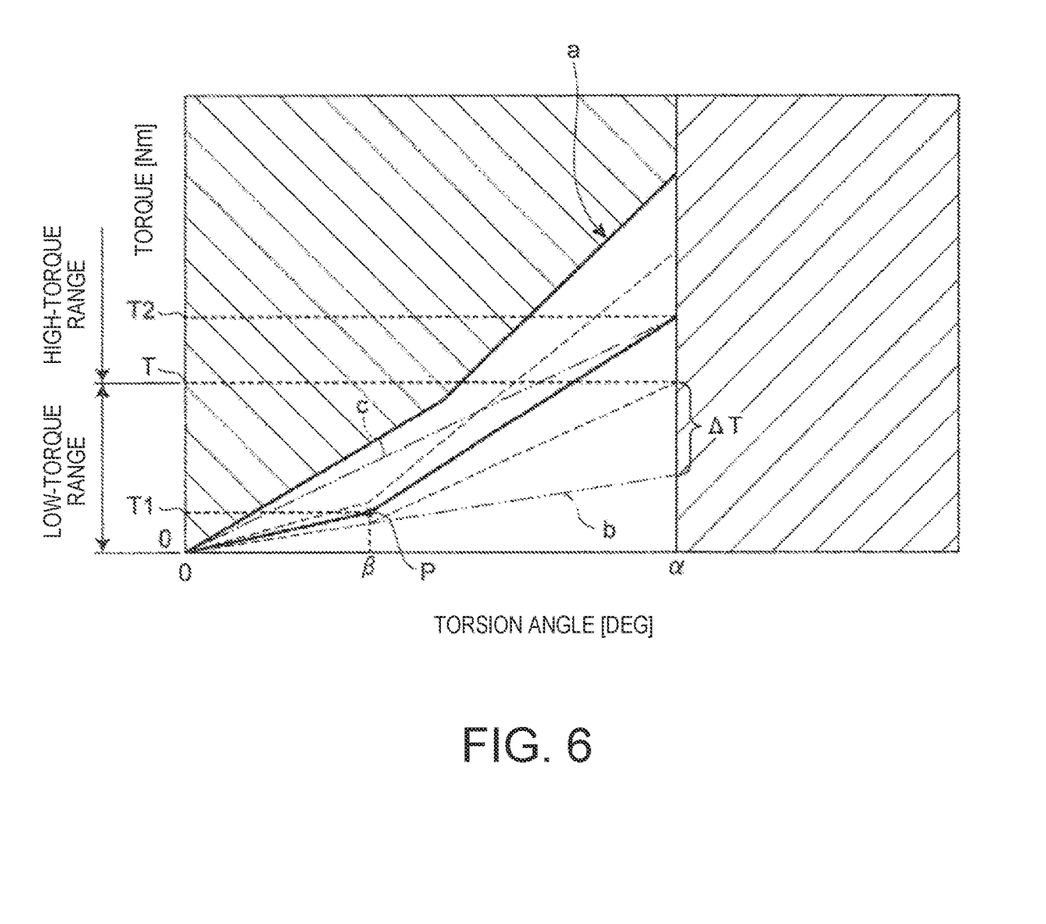
FIG. 6 is a graph illustrating a rigidity of the damper (an input torque versus a torsion angle) in this embodiment.

FIG. 6 illustrates a relationship of an input torque inputted into the input shaft 41 of the rear-wheel drive part 30 versus an angle of torsion of the dampers 80A and 80B (the amount of relative movement of the inner cylinder part and the outer cylinder part) during a period where the rear-wheel drive part 30 reaches the power transmitting state from the no-power transmitting state (e.g., in the FWD state, and from the FWD state to the 4WD state).

In FIG. 6, for the purpose of suppressing the tooth hammering sound between the transfer gear sets, an upper limit line a of the rigidity of the damper which is set so that the rear-wheel drive part 30 does not resonate with the engine torque variation, an upper limit a of the angle of torsion (an angle of torsion when the stopper mechanism operates) which is set according to the torsional limit of the elastic member, and a lower limit T of the input torque when the rear-wheel drive part 30 does not resonate with the engine torque variation any more, are illustrated.

Note that the low-torque range in this embodiment is a range below the lower limit T of the input torque, and the high-torque range is a range exceeding the lower limit T of the input torque. Moreover, the rigidity of the damper is illustrated by a slope of the input torque to the angle of torsion. In detail, the rigidity of the damper increases as the slope of the input torque to the angle of torsion becomes steeper, while the rigidity of the damper decreases as the slope is milder.

Particularly, the resonance of the rear-wheel drive part 30 to the engine torque variation tends to occur when the state is closer to the FWD state (a low-torque state where the torque inputted into the transfer apparatus is low (e.g., 50 Nm or less)). Therefore, it is desirable to have a lower rigidity (a milder slope of the torque to the angle of torsion).

Therefore, the upper limit line a of the damper rigidity is set so that the rigidity becomes lower in the low-torque range, as compared with the rigidity in the high-torque range. In other words, an amount of increase in the transmission torque capacity of the damper to the angle of torsion in the high-torque range is set larger than the amount of increase in the transmission torque capacity of the damper to the angle of torsion in the low-torque range.

Moreover, as illustrated in FIG. 6, when the angle of torsion reaches the upper limit α before the input torque becomes above the lower limit T, since the rear-wheel drive part 30 resonates with the engine torque variation, the threshold is set so that the input torque becomes above the lower limit T at the upper limit a of the angle of torsion. In other words, the transmission torque capacity of the damper is set so as to be above the lower limit T at the upper limit α of the angle of torsion. Note that the transmission torque capacities of the damper to the angles of torsion are illustrated by the input torques corresponding to the angles of torsion. The transmission torque capacity of the damper is proportional to the rigidity.

As described above, the rigidity of the damper for the rear-wheel drive part 30 not to resonate with the engine torque variation is particularly set lower in the FWD state (a state where the torque transmitted to the rear-wheel drive part 30 does not reach the lower limit T). On the other hand, the rigidity (the slope of the torque to the angle of torsion) is set to increase (brings the slope steeper) near the upper limit a of the angle of torsion. In other words, the characteristic of the torque to the angle of torsion of the at least one damper 80 is such that the rigidity is lower for reducing the angle of torsion when the input torque is smaller, and the rigidity is higher for increasing the angle of torsion when the angle of torsion is near the upper limit α and is smaller than the upper limit a. For example, the characteristic curve is desirably an upwardly bending curve.

However, generally, it is known that the characteristic of the torque to the angle of torsion of the shear damper is linear. For example, when the damper with the lower rigidity is used in order to achieve the lower rigidity in the low-torque range, the angle of torsion reaches the upper limit α of the angle of torsion before the rigidity of the damper increases, as illustrated by an imaginary line b in FIG. 6. In this case, before the transmission torque capacity of the damper reaches the lower limit T of the input torque, the input shaft and the power transmission shaft become in the state of transmitting the torque. As a result, until the input torque reaches the lower limit T (ΔT), the tooth hammering sound occurs between the drive gear provided to the power transmission shaft and the driven gear which meshes with the drive gear.

On the other hand, in order to suppress the occurrence of the tooth hammering sound, it is possible to use the high-rigidity damper to improve the transmission torque capacity of the damper, as illustrated by an imaginary line c in FIG. 6. In this case, since the rigidity of the damper is increased from the low-torque range, it disagrees with the characteristic for reducing the torsional rigidity in the low-torque range. Moreover, since variations occur in the elastic member due to manufacturing, if this is taken into consideration, the rigidity of the damper may exceed the upper limit line a.

In order to address this situation, the transfer apparatus 40 of the embodiment achieves the damper characteristics which satisfy the conditions described above, by using the first damper 80A and the second damper 80B which are different in the rigidity, as described above.

In detail, for shifting the natural frequency of the rear-wheel drive part 30 in the low-torque range from the resonance range to the engine torque variation, the torsional rigidity of the rear-wheel drive part 30 is lowered by transmitting the torque inputted into the input shaft 41 to the power transmission shaft 46 through the first damper 80A with low rigidity (the slope of the torque to the angle of torsion is mild) until the angle of torsion reaches the given angle of torsion in the low-torque range.

On the other hand, for turning the damper characteristics to the high rigidity so that the transmission torque capacity of the damper exceeds the lower limit T of the input torque (becomes in the high-torque range) at the upper limit α of the angle of torsion, the transmission torque capacity of the damper is increased near the upper limit α of the angle of torsion by the second damper 80B which is higher in the rigidity (the characteristic in which the slope of the torque to the angle of torsion becomes the steep) than the first damper 80A.

The timing at which the power transmitting path through the second damper 80B in addition to the first damper 80A is established based on the angle of rotation β (second backlash) which permits the relative rotation between the inner cylinder part 82 of the second damper 80B and the input shaft 41 in their spline-fitting part. That is, as illustrated in FIG. 6, when the angle of torsion becomes β, the power transmitting path through the second damper 80B in addition to the first damper 80A is formed.

For lowering the torsional rigidity of the rear-wheel drive part 30, it is desirable to use the power transmitting path through the first damper 80A in a wider range, and it is desirable to bring the angle of rotation β closer to the upper limit α of the angle of torsion. Moreover, in order to transit the power transmitting path only through the first damper 80A smoothly (without experiencing the rigidity difference) to the power transmitting path through the first damper 80A and the second damper 80B, it is necessary to provide an intersection P between the characteristic of the first damper 80A and the characteristic of the second damper 80B (a point at which they have the same rigidity).

Therefore, in order to provide the intersection P between the characteristic of the first damper 80A and the characteristic of the second damper 80B, while bringing the angle of rotation β closer to the upper limit α of the angle of torsion, it is necessary to increase the rigidity of the second damper 80B (make the slope of the torque to the angle of torsion steeper).

However, since the increase in the rigidity of the second damper 80B originates in the characteristic of the elastic member, there may be a limitation. Therefore, in this embodiment, the angle of rotation β is set based on the intersection P between the characteristic of the first damper 80A and the characteristic of the second damper 80B which is set according to the characteristic of the second damper 80B.

As described above, near the high-torque range in the low-torque range, the transmission torque capacity of the damper is increased toward the upper limit α of the angle of torsion, while shifting the natural frequency of the rear-wheel drive part 30, by using the power transmitting path through the second damper with high rigidity (the characteristic in which the slope of the torque to the angle of torsion is steep) in addition to through the first damper with low rigidity.

Since the transmission torque capacity of the at least one damper 80 can be increased by the shear deformation of the second damper 80B, the torsional rigidity of the rear-wheel drive part 30 can be continuously (smoothly) increased, and therefore, the rapid change in the rigidity of the transfer apparatus can be suppressed.

Note that as described above, the damper varies due to the manufacturing, for example, as illustrated by upper and lower broken lines indicating tolerance centering on a designed value illustrated by a solid line illustrated in FIG. 6. Therefore, if the designed value is designed very close to the lower limit illustrated by the lower broken line, the torque may be less than the lower limit. Accordingly, in this embodiment, the designed value is set so that the torque will not become below the lower limit even if the variation is taken into consideration.

According to the above configuration, the torque inputted into the input shaft 41 is transmitted to the drive gear 43 through the first damper 80A which does not have the backlash until the second backlash L2 is eliminated (e.g., particularly in the low-torque range among the state where the torque inputted into the input shaft 41 is low, the rear-wheel drive part 30 is in the no-power transmitting state, or the torque-transmitting state where the rear-wheel drive part 30 does not resonate with the torque variation in the normally-used range of the engine 6). Therefore, the rigidity of the rear-wheel drive part 30 can be reduced by the first damper 80A.

Moreover, the torque inputted into the input shaft 41 is transmitted to the drive gear 43 through the second damper 80B, in addition to through the first damper 80A, until the first backlash L1 is eliminated after the torque inputted into the input shaft 41 reaches the given input torque T1 at which the second backlash L2 is eliminated (e.g., until the torque inputted into the input shaft 41 reaches the high-torque range, the rear-wheel drive part 30 becomes in the power transmitting state, or the rear-wheel drive part 30 becomes in the torque-transmitting state in the normally-used range of the engine 6 where it does not resonate with the torque variation). Therefore, the first damper 80A and the second damper 80B can reduce the rigidity of the rear-wheel drive part 30, and the transmission torque capacity can be obtained by the first damper 80A and the second damper 80B, increased more than that only by the first damper 80A.

Moreover, when the torque inputted into the input shaft 41 reaches above the given input torque T2 at which the first backlash L1 is eliminated, the torque inputted into the input shaft 41 is transmitted to the drive gear 43 bypassing the dampers 80A and 80B.

Thus, according to the splines provided with the backlashes of different sizes which are formed in the power transmitting path from the main drive wheel drive part 20 to the drive gear 43, the power transmitting path is selected according to the magnitude of torque transmitted to the transfer apparatus 40, and therefore, the rigidity of power transmitting path can be changed.

Therefore, in the power transmitting path through the first damper 80A, by reducing the torsional rigidity of the rear-wheel drive part 30, it becomes possible to shift the natural frequency to the oscillating range in which the rear-wheel drive part 30 does not resonate with the torque variation which may be caused in the normally-used range of the engine speed, and the tooth hammering sound between the transfer gear sets 43 and 44 can be suppressed. In the power transmitting path through the first damper 80A and the second damper 80B, the torque which can be taken by the at least one damper 80 (transmission torque capacity) can be increased, while reducing the torsional rigidity of the rear-wheel drive part 30.

Therefore, in the state where the torque inputted into the input shaft 41 is in the low-torque range (in the no-power transmitting state where the rear-wheel drive part does not transmit the torque), the power transmission device has the characteristic of low rigidity for lowering the torsional rigidity of the rear-wheel drive part 30, and in the state where the torque inputted into the at least one damper 80 approaches the high-torque range (where the stopper mechanism operates), it has the characteristic of high rigidity for suppressing the rapid rigidity increase.

As described above, according to the power transmission device for the vehicle provided with the drive wheels and the auxiliary drive wheels, since the shear damper is used, the cost can be reduced, and the aimed characteristic of the rigidity between the input shaft and the transfer gear can be acquired.

Moreover, as described above, the rigidity of the second damper 80B (the characteristic of the input torque to the angle of torsion) is set higher than the rigidity of the first damper 80A. Thus, as compared with a case where the rigidity of the second damper 80B is equal to the rigidity of the first damper 80A, the transmission torque capacity which can be taken by the first damper 80A and the second damper 80B can be increased. Moreover, by increasing the rigidity of the second damper 80B, the slope of the input torque to the angle of torsion of the second damper 80B can be made steeper. Therefore, the characteristic curve, which forms an upwardly bending curve, in which the range of low rigidity by the first damper 80A can be expanded, and the input shaft 41 and the power transmission shaft 46 can easily and smoothly reach the direct coupling state, can be easily obtained.

Moreover, as described above, the first damper 80A which transmits power in the state where the torque is lower than the second damper 80B is disposed on the anti-input shaft 41 side of the second damper 80B. Therefore, since the first damper 80A is responsible for the power transmission in the low-torque range, the spline-fitting area between the input shaft 41 and the first damper 80A can be shortened according to the torque transmitted to the extent so that the necessary surface pressure is secured. As a result, it becomes possible to shorten the input shaft 41, and the weight and the cost can be reduced. Moreover, since the first damper 80A is fitted onto the input shaft 41 by the spline without the backlash, the falling-off of the dampers 80A and 80B from the input shaft 41 can be suppressed.

Moreover, as described above, since the common spline (i.e., external tooth 41a) to the power transmission shaft 46, the first damper 80A, and the second damper 80B is formed in the input shaft 41, the power transmitting path of the transfer apparatus can be selected and the rigidity can be changed by the simple structure where the size (angle) of the backlashes is adjusted by the power transmission shaft 46, the inner cylinder part 81 side of the first damper 80A, and the inner cylinder part 82 side of the second damper 80B. Moreover, since the spline of the input shaft 41 can be formed by one machining process, the number of processes can be reduced and the cost can be reduced.

Moreover, as described above, in the FWD state of a so-called "FF (front-engine, front-drive) based 4WD vehicle," or in the RWD state of a so-called "RR (rear-engine, rear-drive) based 4WD vehicle," the natural frequency of the rear-wheel drive part 30 can be shifted to the oscillating range where the rear-wheel drive part 30 does not resonate with the torque variation which may be caused in the normal range of the engine speed. Therefore, the tooth hammering sound at each engage part of the rear-wheel drive part 30 can be suppressed effectively.

Since the first damper 80A is disposed so as to overlap with the transfer gear sets 43 and 44 in the axial direction of the input shaft 41, the axial dimension of the transfer apparatus 40 can be reduced.

The present disclosure is not limited to the illustrated embodiment, and it may be variously improved and changed in the design without departing from the spirit of the present disclosure.

Moreover, although in this embodiment the so-called "FF (front-engine, front-drive) based 4WD vehicle is described, the present disclosure is not limited to this configuration, and it may also be applied to a so-called "FR (front-engine, rear-drive) based 4WD vehicle," and a so-called "RR (rear-engine, rear-drive) based 4WD vehicle."

Although the two shear dampers are used, three or more dampers may be used depending on the performance required for the dampers.

Moreover, although in this embodiment the rigidity of the first damper 80A differs from the rigidity of the second damper 80B, the rigidity of the first damper 80A may be the same as the rigidity of the second damper 80B.

Moreover, although in this embodiment the torque inputted into the transfer apparatus 40 is transmitted to the outer cylinder part side from the inner cylinder part side of the damper, the torque may be transmitted to the inner cylinder part side from the outer cylinder part side.

As described above, according to the present disclosure, since the power transmission device for the vehicle provided with the main drive wheels and the auxiliary drive wheels becomes possible to obtain the aimed characteristic while using the shear damper, it may be suitably utilized in the manufacturing field of industry of this kind of 4WD vehicle.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 Front Wheel (Main Drive Wheel)
4 Auxiliary Drive Wheel
6 Engine (Drive Source)
20 Main Drive Wheel Drive Part
30 Auxiliary Drive Wheel Drive Part
40 Transfer Apparatus (Power Extraction Part)
41 Input Shaft
43 Transfer Drive Gear
44 Transfer Driven Gear
46 Power Transmission Shaft
80A First Damper
80B Second Damper
L1 First Backlash
L2 Second Backlash

What is claimed is:

1. A power transmission device, comprising:
a main drive wheel drive part configured to transmit power from a drive source to main drive wheels; and
an auxiliary drive wheel drive part having a power extraction part configured to extract from the main drive wheel drive part the power to be transmitted to auxiliary drive wheels, the power extraction part having a transfer gear set comprised of a transfer drive gear connected to the main drive wheel drive part, and a transfer driven gear meshing with the transfer drive gear and configured to transmit the power to the auxiliary drive wheels,
wherein, in a power transmission path from the main drive wheel drive part to the transfer drive gear, an input shaft connected to the main drive wheel drive part and a power transmission shaft connected to the transfer drive gear are coupled to each other in a radial direction through a first spline having a first backlash, and
wherein a first shear damper without backlash and a second shear damper provided with a second spline having a second backlash smaller than the first backlash are provided between the input shaft and the power transmission shaft.

2. The power transmission device of claim 1, wherein the second shear damper is higher in rigidity than the first shear damper.

3. The power transmission device of claim 2, wherein the second shear damper and the first shear damper are disposed in this order from the input shaft side.

4. The power transmission device of claim 3, wherein the first spline, the second spline, and a third spline provided to the first shear damper form a common spline in the input shaft.

5. The power transmission device of claim 4, wherein the main drive wheels are disposed on a power source side of a vehicle body, and the auxiliary drive wheels are disposed on the opposite side of the vehicle body from the power source.

6. The power transmission device of claim 5, wherein the first shear damper overlaps with the transfer gear set in the axial direction of the input shaft.

7. The power transmission device of claim 4, wherein the first shear damper overlaps with the transfer gear set in the axial direction of the input shaft.

8. The power transmission device of claim 3, wherein the main drive wheels are disposed on a power source side of a vehicle body, and the auxiliary drive wheels are disposed on the opposite side of the vehicle body from the power source.

9. The power transmission device of claim 3, wherein the first shear damper overlaps with the transfer gear set in the axial direction of the input shaft.

10. The power transmission device of claim 2, wherein the first spline, the second spline, and a third spline provided to the first shear damper form a common spline in the input shaft.

11. The power transmission device of claim 2, wherein the main drive wheels are disposed on a power source side of a vehicle body, and the auxiliary drive wheels are disposed on the opposite side of the vehicle body from the power source.

12. The power transmission device of claim 2, wherein the first shear damper overlaps with the transfer gear set in the axial direction of the input shaft.

13. The power transmission device of claim 1, wherein the second shear damper and the first shear damper are disposed in this order from the input shaft side.

14. The power transmission device of claim 13, wherein the first spline, the second spline, and a third spline provided to the first shear damper form a common spline in the input shaft.

15. The power transmission device of claim 13, wherein the first shear damper overlaps with the transfer gear set in the axial direction of the input shaft.

16. The power transmission device of claim 1, wherein the first spline, the second spline, and a third spline provided to the first shear damper form a common spline in the input shaft.

17. The power transmission device of claim 16, wherein the first shear damper overlaps with the transfer gear set in the axial direction of the input shaft.

18. The power transmission device of claim 1, wherein the main drive wheels are disposed on a power source side of a vehicle body, and the auxiliary drive wheels are disposed on the opposite side of the vehicle body from the power source.

19. The power transmission device of claim 18, wherein the first shear damper overlaps with the transfer gear set in the axial direction of the input shaft.

20. The power transmission device of claim 1, wherein the first shear damper overlaps with the transfer gear set in the axial direction of the input shaft.

* * * * *